United States Patent [19]
Petrisko

[11] 4,058,301
[45] Nov. 15, 1977

[54] LOAD LIMITER COUPLING

[75] Inventor: Edwin M. Petrisko, Annapolis, Md.

[73] Assignee: The United States of America as represented by the Secretary of the Navy, Washington, D.C.

[21] Appl. No.: 691,181

[22] Filed: May 28, 1976

[51] Int. Cl.² .............................................. F16F 9/16
[52] U.S. Cl. .................................. 267/124; 267/65 R
[58] Field of Search .................... 267/34, 64 A, 64 B, 267/65 R, 113, 124, 126, 136; 188/311–313, 316, 317, 322; 213/43, 223

[56] References Cited

U.S. PATENT DOCUMENTS

| | | | |
|---|---|---|---|
| 711,345 | 10/1902 | Raders et al. | 213/43 |
| 1,273,059 | 7/1918 | Hild | 267/126 X |
| 1,488,853 | 4/1924 | Webb | 213/43 |
| 2,029,829 | 2/1936 | Messier | 188/312 |
| 2,590,406 | 3/1952 | Haas | 213/43 X |
| 2,915,198 | 12/1959 | Spencer | 213/43 |
| 2,960,289 | 11/1960 | Westcott | 267/64 A UX |
| 3,098,644 | 7/1963 | Phillips | 267/64 A X |
| 3,870,289 | 3/1975 | McMahon | 267/65 R X |

Primary Examiner—Johnny D. Cherry
Attorney, Agent, or Firm—R. S. Sciascia; Q. E. Hodges

[57] ABSTRACT

A uniaxial load limiter pneumatic coupling capable of rigidly transmitting tensile and compressive loads without deformation up to and including a design maximum, and then absorbing static, dynamic, and shock loads in excess of the design maximum by temporary deformation.

5 Claims, 1 Drawing Figure

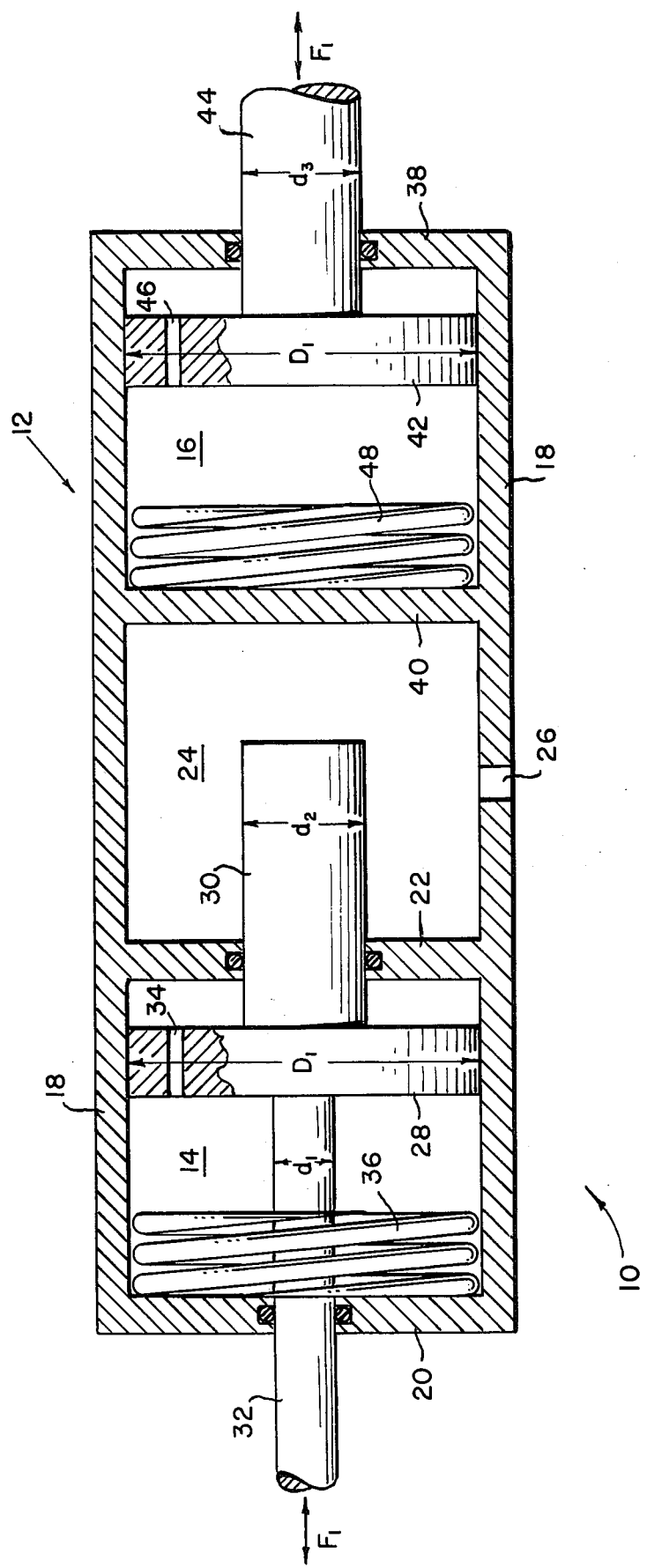

LOAD LIMITER COUPLING

The invention described herein may be manufactured and used by or for the Government of the United States of America for governmental purposes without the payment of any royalties thereon or therefor.

BACKGROUND OF THE INVENTION

This invention relates generally to load limiters, shock absorbers, air springs, and shock mounts, and more particularly to a uniaxial double-acting load limiter pneumatic coupling.

Prior art examples of devices in the above category are generally air spring shock absorbers having a cylinder and a piston with pressurized air on one side for single action, or on both sides of the piston for tensile and compressive loading. Perhaps a bleed orifice is provided in the piston to provide a variable starting position and rate of deformation. Some air spring uniaxial load limiters employ two pistons with pressurized air therebetween, but this arrangement would be single-acting for compressive forces only. In essence, the prior art devices do not provide a double-acting load limiter that maintains loads without deformation up to and including a design maximum, and absorbs loads in excess of the maximum by deforming.

SUMMARY OF THE INVENTION

Briefly the instant invention overcomes the disadvantages of the prior art shock absorbing air springs by providing a load limiter pneumatic coupling that will sustain a design maximum load without deformation, but will temporarily deform to absorb static, dynamic, and shock loads in excess of the design maximum.

Two uniaxial pneumatic actuators or pistons are in coaxial but separate cylinder chambers. Both chambers are pressurized with air to the same pressure in this embodiment. Due to differential piston areas in each chamber being equal, the same force is developed on each piston which displaces both pistons and their piston rods in the same direction and holds them there until the design load is exceeded. When the load is exceeded, orifices in the pistons permit them to move slowly away from their original position. When the excess load is removed, the restoring forces of the pressurized air returns the pistons to their original positions with air flowing through the orifices.

STATEMENT OF THE OBJECTS OF THE INVENTION

Accordingly, an object of the invention is to provide a new and improved load limiter coupling for use in any linear push-pull coupling such as shafts.

Another object of the instant invention is to provide a uniaxial load limiter coupling that sustains both compressive and tensile loads.

A further object of the instant invention is to provide a uniaxial load limiter coupling that will sustain a design maximum load without deformation, but will temporarily deform to absorb loads in excess of the design maximum.

Still another object of the present invention is to provide a uniaxial load limiter coupling that is pneumatic and pressurized.

BRIEF DESCRIPTION OF THE DRAWING

Other objects, advantages, and novel features of the invention will become apparent from the following detailed description of the invention when considered in conjunction with the accompanying drawing wherein the FIGURE is longitudinal cross-sectional view of the load limiter coupling.

DESCRIPTION OF THE PREFERRED EMBODIMENT

Referring now to the drawing, there is shown in the FIGURE a load limiter coupling 10 having a cylinder housing 12 having coaxial chambers 14 and 16. Chamber 14 is defined by cylindrical wall 18, end wall 20, and inner wall 22. On the side of inner wall 22, opposite chamber 14, is an atmospheric pressure chamber 24, perhaps with a vent 26. Contained within chamber 14, is a first piston 28, in sliding and sealing relationship with the cylindrical wall 18. Piston 28 has a diameter shown as $D_1$, and attached to it is a concentric plug piston 30 having a diameter $d_2$. Plug piston 30 extends through inner wall 22 in sliding and sealing relationship into the atmospheric pressure chamber 24. Attached to the piston 28, opposite plug piston 30, is a first piston rod 32 having a diameter $d_1$. First piston rod 32 extends through end wall 20 in sliding and sealing relationship to a uniaxial load (not shown) which produces compressive or tensile forces, designated by a double-headed arrow marked $F_1$ in the figure. The piston 28 has a trans-piston orifice 34. A helical coil spring 36 may be provided inside chamber 14 adjacent the wall 20, but not normally in contact with the piston 28.

Referring now to the coaxial chamber 16, it is defined by the same cylindrical wall 18, end wall 38, and a solid inner wall 40, which also defines part of the atmospheric chamber 24. Contained within chamber 16 is a second piston 42, in sliding and sealing relationship with the cylindrical wall 18. Second piston 42 also has a diameter $D_1$, and attached to it, is a concentric second piston rod 44 having a diameter $d_3$. Second piston rod 44 extends through end wall 38 in sliding and sealing relationship to a uniaxial load or perhaps to a solid ground (not shown) which produces or resists compressive or tensile forces also designated by a double-headed arrow marked $F_1$ in the figure. The second piston 42 also has a trans-piston orifice 46. A helical coil spring 48 may be provided inside chamber 16 adjacent the wall 40, but not normally in contact with piston 42.

The operation of the load limiter coupling is as follows. The chambers 14 and 16 are both charged or pressurized with a gas such as air to a relatively high pressure through charging ports (not shown) and then sealed off. Without load, because of the trans-piston orifices 34 in first piston 28, both sides of the piston have the same pressure. But because of the difference in area between the two faces of first piston 28, which is due to the difference in the diameters $d_1$ of rod 32 and $d_2$ of the plug piston 30, the piston 28 is forced against inner wall 22, i.e., to the right in the figure. Similarly, as to second piston 42, it too has a trans-piston orifce 46 so that both sides have the same pressure. But because of the difference in area between the two faces of second piston 42, which is due to the area taken up by the second piston rod 44, the piston 42 is forced against the outer wall 38, i.e., to the right in the figure.

In use under a compressive load, the first piston 28 is further forced with no movement against the inner wall 22, and the second piston 42 will be a rigid link maintained by high pressure air, up to and including the design maximum, but will temporarily yield inwardly to absorb static, dynamic, and shock loads in excess of the design maximum. The load is absorbed by piston movement allowed by slight air flow through the orifice 46. Likewise, under a tensile load, the second piston 42 is further forced with no movement against the outer wall 38, and the first piston will be a rigid link due to high pressure air up to and including the design maximum, but will temporarily yield outwardly to absorb static, dynamic, and shock loads in excess of the design maximum. Again, the excess load is absorbed by piston movement allowed by slight air flow through the orifice 34. If the springs 36 and 48 are included, and the excess load is such that the pistons encounter the springs, they will aid in taking additional excess loads as well as avoiding damage to the load limiter device.

Obviously many modifications and variations of the present invention are possible in the light of the above teachings. It is therefore to be understood that within the scope of the appended claims the invention may be practiced otherwise than as specifically described.

What is claimed is:

1. A load limiter coupling for transmitting and absorbing loads comprising:
    a hollow cylinder means having at least three chambers formed by fixed partition walls and the end walls of said cylinder means,
    first means within said cylinder for initially rigidly transmitting a tensile load force up to a design maximum; and
    second means within said cylinder for initially rigidly transmitting a compressive load force up to a design maximum load, and then absorbing compressive loads in excess of said maximum.

2. The load limiter coupling of claim 1 wherein said means for transmitting and absorbing a tensile load comprises:
    a first chamber in said cylinder charged with a pressurized gas;
    a first piston within said chamber in sliding and sealing relationship therewith;
    a trans-piston orifice through said first piston;
    a stub piston of smaller diameter attached to a side of said first piston;
    a second chamber open to the atmosphere into which said stub piston extends through a wall in sliding and sealing relationship; and
    a piston rod attached to the other side of said first piston and extending through an outside wall of said first cylinder in sliding and sealing relationship for connection to a load.

3. The load limiter coupling of claim 2 wherein said means for transmitting and absorbing a compressive load comprises:
    a third chamber within said cylinder charged with a pressurized gas;
    a second piston within said third chamber in sliding and sealing relationship therewith;
    a trans-piston orifice through said second piston; and
    a piston rod attached to said second piston and extending through an outside wall of said third chamber in sliding and sealing relationship for connection to an object.

4. The load limiter coupling of claim 3 wherein said pressurized gas comprises:
    a quantity of air.

5. The load limiter coupling of claim 4 wherein said first and said third chambers each further contain:
    a helical spring normally not in contact with said first and said seond pistons, for absorbing tensile and compressive loads in excess of the design maximum load.

* * * * *